United States Patent [19]

Calvert et al.

[11] 3,907,984

[45] Sept. 23, 1975

[54] HAIR HOLDING COMPOSITIONS CONTAINING A WATER-INSOLUBLE BLOCK COPOLYMER

[75] Inventors: Anthony J. Calvert, Tilehurst; Eric C. Collingwood; Richard Johnston, both of Woodley, all of England

[73] Assignee: The Gillette Company, Boston, Mass.

[22] Filed: Feb. 7, 1974

[21] Appl. No.: 440,507

[30] Foreign Application Priority Data
Feb. 12, 1973 United Kingdom............... 06721/73

[52] U.S. Cl.......... 424/47; 260/33.4 R; 260/33.8 R; 260/33.8 UA; 260/879; 424/DIG. 1; 424/DIG. 2; 424/71; 424/78; 424/81
[51] Int. Cl.²............................................ A61K 9/11
[58] Field of Search....... 260/879, 29.6 HN, 33.4 R, 260/33.8 R, 33.8 UA; 424/47, 71, DIG. 1, DIG. 2, 78, 81

[56] References Cited
UNITED STATES PATENTS

| | | | |
|---|---|---|---|
| 3,265,765 | 8/1966 | Holden et al. | 260/879 X |
| 3,399,159 | 8/1968 | Samour | 260/29.6 HN |
| 3,410,838 | 11/1968 | Strobel | 260/879 X |
| 3,431,323 | 3/1969 | Jones | 260/879 X |
| 3,577,517 | 5/1971 | Kubot et al. | 424/47 |
| 3,600,464 | 8/1971 | Bauer et al. | 260/879 |

*Primary Examiner*—Albert T. Meyers
*Assistant Examiner*—Vera C. Clarke
*Attorney, Agent, or Firm*—Richard A. Wise; Oistein J. Bratlie; Mandel E. Slater

[57] ABSTRACT

Hair holding compositions are disclosed comprising solutions of water-insoluble block copolymers of the type A-B-(A-B)$_n$-A, where the A segment is a polymer having a glass transition temperature above room temperature, the B segment is a polymer having a glass transition temperature below room temperature, and n is zero or an integer from 1 to 5. The compositions provide excellent "feel" and set retention characteristics.

7 Claims, No Drawings

HAIR HOLDING COMPOSITIONS CONTAINING A WATER-INSOLUBLE BLOCK COPOLYMER

BACKGROUND OF THE INVENTION

1. Field of the Invention

This invention relates to hair holding compositions, to polymers useful therein, and to a method of using such compositions.

2. Description of the Prior Art

As is well known, hair sprays and setting lotions comprise a solution of a polymeric material in a solvent. When hair is contacted with the solution and the solvent then evaporated, a thin coating of the polymer is formed on the individual hairs and/or at cross-over points between two or more individual hairs (the former effect predominating when setting lotions are used in the conventional way and the latter when hair sprays are used), which polymer coating constrains the hairs in a desired configuration. There are three main criteria which determine the suitability or otherwise of a polymeric material as a hair spray or setting lotion ingredient. Firstly, it must be soluble in suitable solvents. The usual solvent used in hair sprays is (for medical and other reasons) ethanol, although, in some countries, methylene dichloride and isopropanol are also used; the usual concentration of polymer in solution is about 1 to 4 percent by weight. Some setting lotions are aqueous and some comprise solutions in ethanol or aqueous ethanol; the usual concentration of polymer in solution is about 3 to 5 percent.

Secondly, the polymer coating (on the hair) must not be water-sensitive, that is to say it must not become tacky when exposed to a humid atmosphere. In aqueous setting lotions, the polymers (being soluble in water) are generally more water-sensitive than polymers which are insoluble in water, but soluble in, say, alcohol.

Thirdly, the polymer coating (on the hair) must exhibit good feel, that is it must be neither too brittle or stiff nor too soft and elastic.

It has been found in the past that while many homopolymers exhibit good feel, they tend to fall short of combining good solubility in ethanol with good resistance to humidity. In an attempt to overcome this problem, random copolymers have been used, but, in general, these still have the disadvantage that either they are not adequately soluble in ethanol, or they are more water-sensitive than desired.

SUMMARY OF THE INVENTION

Accordingly, it is an object of the present invention to provide hair holding compositions that impart good feel to the hair and provide good resistance to humidity.

Another object of the invention is to provide polymers for hair holding compositions that are soluble in organic solvents such as ethanol and impart good feel and humidity resistance to hair.

Still another object of the invention is to provide polymers for hair holding compositions that can readily be prepared by conventional methods of polymer synthesis.

These and other objects are realized by providing a hair holding composition which comprises an organic solvent solution of a water-insoluble block copolymer of the type A-B-(A-B)$_n$-A, in which segment A is a polymer having a glass transition temperature above room temperature, segment B is a polymer having a glass transition temperature below room temperature, and n is zero or an integer from 1 to 5. Room temperature for the purposes of this invention is defined as the range of temperatures which would generally be encountered in application of the hair holding compositions to the hair, e.g. from about 16° to about 35°C. Generally the A polymer should have a glass transition temperature ($T_G$) of at least about 40°C., and preferably should have $T_G$ in the range 40°–90°C. Polymers having $T_G$ above 90°C. may be employed in preferred embodiments if they are plasticized to bring $T_G$ into the preferred range.

As is well known, hair sprays are normally sold in aerosol formulations and the present invention includes within its scope aerosol hair spray formulations comprising a block copolymer solution according to the invention. Typically aerosol hair spray formulations may also contain additional ingredients, such as neutralizer, depending on the acidity or basicity of the polymer, plasticizer, perfume, and a propellant, which may be either a compressed or a liquefied gas. As examples of such propellants mention may be made of carbon dioxide, nitrous oxide, dichlorodifluoromethane, trichloromonofluoromethane, trichlorotrifluorethane, tetrafluorodichloroethane, butane, propane, isobutane, and mixtures and blends of the above. The use of such additional ingredients and their relative proportions in the particular formulation depend on factors well known to those skilled in the art.

In the case of setting lotions the block copolymer may, if desired, contain water in an amount insufficient to cause precipitation of the block copolymer.

Polymers which have a glass transition temperature below room temperature (e.g. below about 20°C.) are rubbery at room temperature, while those which have a glass transition temperature of 40°C. or above are in a glassy state at room temperature. There are many suitable polymers for segments A and B, examples being polymers of:

A a vinylpyridine, such as 2-vinylpyridine, 4-vinylpyridine, and 2-methyl-5-vinylpyridine;

acrylamides or methacrylamides of the formula $CH_2=CXCONR'R''$, where X is H or $CH_3$, R' is H or an n-alkyl group containing from 3 to about 8 carbon atoms, and R'' is an n-alkyl group containing 3 to about 8 carbon atoms.

B butadiene;
isoprene;
isobutene;
alkyl acrylates, where the alkyl group contains from 2 to 12 carbon atoms;
alkyl methacrylates, where the alkyl group contains from 4 to 12 carbon atoms;
vinyl n-alkyl ethers, where the alkyl group contains from 1 to about 4 carbon atoms.
alkyl-substituted butadienes, where the alkyl group contains from 1 to about 4 carbon atoms; and
chloroprene.

While the present invention is primarily concerned with the use of block copolymers of the A-B-A type, the same advantageous combination of properties is also found in block copolymers containing additional B and A segments, that is, in generalized form, block copolymers of the A-B-(A-B)$_n$-A type, where $n$ is an integer from 1 to 5, preferably 1 or 2, and segments A and B are as defined above. Such block copolymers are more complicated to prepare than A-B-A block copolymers and a multi-stage process is necessary; they are, therefore, more expensive to produce than A-B-A block copolymers and since they do not exhibit any significant improvement over the corresponding A-B-A copolymers, they are less preferred than the latter.

The block copolymers defined above are novel compounds and constitute a further aspect of the present invention.

In these block copolymers, the segment B polymer will be insoluble in ethanol, while the segment A polymer will be soluble, so that when ethanol is used as the organic solvent of the hair spray or setting lotion, the proportion of A in the copolymer will be chosen so that the copolymer is soluble to the desired extent. The appropriate amount of A required to give the copolymer the desired solubility can be determined by routine trial and experiment. Generally the A segment should comprise from about 10 to about 90 percent by weight of the block copolymer and, complementally, the B segment from about 90 to about 10 percent by weight. In the particular case where A is poly (2-vinylpyridine) and B is polybutadiene, at least about 70 percent by weight of the copolymer should be poly (2-vinylpyridine) if the copolymer is to be soluble in ethanol to form a 1–4 percent solution. (It is to be understood that all per cent compositions stated herein are by weight.)

It will be appreciated, however, that where other and better solvents, such as methylene dichloride or isopropanol, are used as the organic solvent in the hair spray or setting lotion, the segment B polymer itself may dissolve or nearly dissolve in the solvent and very little (e.g. about 10 percent), segment A polymer will be required to achieve the desired solubility. In such cases, preferred proportions of A and B in the copolymer will be determined by the feel and the water-sensitivity of the polymer.

The feel of the block copolymers will vary with the relative weight proportions of the segments A and B. Thus, where there is very little A, the copolymer will be rubbery and elastic, and where there is very little B, it will be harder and stiffer. The most desirable feel lies between these two extremes, but it is not necessarily achieved with 50/50 proportions of A and B. The precise proportions of A and B required to give the optimum feel will vary with the nature of A and B and can be determined in any particular case by routine trial and experiment. When A is poly (2-vinylpyridine) and B is polybutadiene, good feel can be obtained with polybutadiene contents varying from about 90 percent down to about 10 percent.

The water-sensitivity of the copolymers will also vary depending on the proportions of A and B. Again, the optimum proportions, or range of proportions, can be determined by routine trial and experiment. In the case when A is poly (2-vinylpyridine) and B is polybutadiene, good resistance to humidity is obtained when the amount of polybutadiene is 10 percent or greater.

It will be appreciated from the above that when a block copolymer in which A is poly (2-vinylpyridine) and B is polybutadiene is to be used in a hair spray or setting lotion, as a solution is ethanol, the optimum amount of segments A in the copolymer is from about 70 percent to about 90 percent. In such cases, the copolymer has the desired solubility and good feel. In addition, its resistance to humid conditions is very good and is substantially better than many of the random copolymers currently in use in hair sprays. While the resistance to high humidity is very good, the polymers can still easily be removed from hair by shampooing. This excellent resistance to humidity is achieved with amounts of segments A down to 20 percent or below (e.g. about 10 percent), so that where the copolymer is to be used in solution in, say, methylene dichloride, the proportion of segments A can vary from about 10 up to about 90 percent for optimum properties.

As will be well understood, the viscosity and, to some extent, the solubility of the copolymers will vary with their molecular weight. In this connection, we have found it desirable (at least where the polymers are to be used in aerosol hair sprays) to keep the molecular weight of poly (2-vinylpyridine)/polybutadiene copolymers below about 100,000 since at higher levels, the polymer solution has a viscosity such that it tends to "jet" out of the aerosol dispenser rather than form a spray of fine droplets. Hair holding properties are obtained with polymers having molecular weights down to about 10,000 but generally the best results are obtained if the molecular weight is over 50,000. It is also generally desirable to avoid high molecular weights because solubility tends to decrease with increasing molecular weight. As in the cases of water-sensitivity, feel, and solubility, routine trial and experiment will reveal the best molecular weight ranges in any particular case.

In addition to using the setting lotions according to the invention in conventional ways, we have found that when the block copolymers present therein are of a particular kind, they can be used to obtain a semi-permanent set, that is a set which remains until the hair is next washed. Such a semi-permanent set is obtained by applying the setting lotion to damp hair, combing the hair and setting it into the desired style, and then rapidly drying the hair at a temperature of 80° to 90°C. for 2 to 3 minutes. Although this temperature of 80° to 90°C. is considerably higher than is conventionally used in home or professional hair waving, it has been found that such temperatures can be tolerated for the short drying periods required.

The set obtained in this way is substantially unaffected by conditions of high humidity because of the good humidity resistance of the block copolymers according to the invention, but since it is dependent on the polymer coating on the individual hairs and on hair cross-over points, and the polymer is removed by conventional shampooing, it is destroyed by washing the hair. After the hair has been washed, a further semi-permanent set may, of course, be applied in the manner described.

In order to obtain this effect, it is generally desirable that the segments A of the copolymer should be of a polymer that has a glass transition temperature of from 40° to 90°C., the segment B being as defined above. The specific segment A polymers mentioned above, that is poly (2-vinylpyridine), poly (4-vinylpyridine), etc., all have glass transition temperatures above 90°C., but we have found that these polymers are effectively plasticized by the perfuming agents conventionally incorporated in setting lotions to the extent that their glass transition temperatures are reduced to 90°C. or less and lie in the range of 40° to 90°C. The amount of such perfuming agents required to effect this reduction in the glass transition temperature is, in general, the amount in which they are normally present in setting lotions, that is from about 0.1 to 0.3 percent by weight of the setting lotion, which is less than 10 percent by weight of the normal polymer content of setting lotions. Plasticizers which reduce the glass transition temperature of such polymers to within the range 40° to 90°C. and which are not perfuming agents can, of course, also be used, but since toiletries such as setting lotions almost invariably contain perfuming agents, it is convenient not to use an added non-perfuming plasticizer and to use only one or more perfuming agents which have a plasticizing effect.

While the block copolymers with which this invention is concerned can be made, at least on a laboratory scale, in several ways, we believe that the best method currently available (and which could be operated on a commercial scale) is the so-called "living polymer" method. This is a well-known technique for preparing block copolymers and no detailed description will, therfore, be given. Essentially, the method comprises first forming the middle segment B by polymerizing the appropriate monomer, and then forming simultaneously on to the two ends of segment B, the segments A by polymerizing the appropriate monomer in the presence of the already formed segment B. The polymerization is initiated in the presence of a solvated electron solution, such as is formed by mixing sodium and naphthalene in tetrahydrofuran or by lithium butyl. To make copolymers containing additional B and A segments, the procedure is repeated, first to form one or two additional B segments and then to form one or two additional A segments, and further repeated as required.

As is well known, block copolymers prepared by the living polymer method have a very narrow molecular weight distribution and this is an advantage in preparing the copolymers with which we are concerned.

It will also be appreciated that not all monomers can be polymerized by this method, but in such cases other procedures are available and are well known to those skilled in the art.

The block copolymers according to the invention can be characterized by any of the parameters normally applied to polymers. The fact that they are block copolymers is normally established by the method of preparation used, the method not being capable of giving rise to a random copolymer or a graft copolymer; this is, in particular, the case when the living polymer method is used.

The relative proportions of A and B segments in the block copolymer can be determined by a number of methods. Thus when one of the segments contains an atom, such as nitrogen or chlorine, which is not present in the other, the block copolymer can be analyzed to determine the percentage of such atom present and by computation from the percentage of such atom in a homopolymer of that segment, the proportion of that segment in the block copolymer can be determined. In addition to elemental analysis, the absorbance of a solution of the block copolymer in a suitable solvent at a particular wavelength in the ultra-violet region characteristic of an atom present in one segment, but not in the other, may be used.

For example, in the case of block copolymers in which the A segments are derived from 2-vinylpyridine, 4-vinylpyridine or an acrylamide or methacrylamide of the formula $CH_2=CXCONR'R''$, and the B segment is derived from butadiene or any of the other specific B monomers referred to above, nitrogen estimation may be carried out by the Dumas method, or the U.V. absorbance of a solution of the block copolymer at 263 m$\mu$ may be measured.

A further method of determining the relative proportions of the A and B segments in the block copolymers is by infra-red analysis, the size of a first peak in the I.R. spectrum characteristic of the A monomer being compared with the size of a second peak characteristic of the B monomer. By such comparison a quantitative determination of the relative proportions of the two segments can be made. By way of example, for the block copolymer in which the A segments are derived from 2-vinylpyridine and B segment from butadiene, the peaks at 9.55$\mu$ and 6.1$\mu$ respectively, are measured.

When the block copolymer is produced by the living polymer method, care is taken to polymerize all of the B segment monomer introduced before introducing any of the A segment monomer and then to ensure that all of the A segment monomer introduced is polymerized, it is found that the relative proportions of A and B segments in the final copolymer are substantially identical with the relative proportions of the monomers used.

In order that the invention may be more fully understood, the following examples are given by way of illustration only:

EXAMPLES 1–6

Six block copolymers of the A-B-A type were made by the living polymer method, in which A was poly (2-vinylpyridine) and B was polybutadiene, the copolymers differing in the relative proportions of A segments and B segment they contained.

The procedure used for making the first of the copolymers was as follows:

All solvents and reactants used were vigorously dried and the reaction was carried out in vacuum or under absolutely dry argon that was free of oxygen.

51.2mls of the initiator solution, a 0.166 molar solution of sodium naphthalene in tetrahydrofuran, were introduced into a reaction vessel under vacuum. The vessel was cooled to −110°C. and 38.8 grams of 1,3-butadiene were distilled in. The mixture was allowed to warm up to 0°C. as dry argon was introduced into the vessel. A solution of "living" polybutadiene in tetrahydrofuran was obtained, which has a bright orange color. When the butadiene polymerization was complete, the vessel was once again cooled down to −100°C. and 161.2 grams of 2-vinylpyridine were introduced while the mixture was stirred at high speed. The color of the solution changed from the orange of the butadiene to the cherry red color of poly (2-vinylpyridine). The solution was allowed to warm up to room temperature and then allowed to stand for one hour. The "living" polymer was then terminated by the addition of methanol to the mixture, and a colorless copolymer solution was obtained. The copolymer was isolated by precipitation with ether.

Alternatively, the copolymer could be isolated by spray drying the final reaction mixture.

The molecular weight of the copolymer was approximately 100,000 based on a determination of intrinsic viscosity in methanol at 30°C.

The relative proportions of A and B segments in the copolymer were determined by nitrogen analysis and from the infra-red spectrum at 6.1μ (for butadiene) and 9.55μ (for vinylpyridine) as described above, and were found to be the same as the relative proportions of the monomers used, that is 80.6 percent of A segments and 19.4 percent of B segment.

Five other block copolymers having the same A and B segments, but in different proportions, were made in the same way by appropriate adjustment of the amounts of the two monomers used. The relative proportions of A and B segments in these block copolymers are given in Table I below.

All six copolymers were soluble in methylene chloride, but only copolymers 1 and 2 were soluble (to form a 3 percent solution) in ethanol.

The set holding properties of the polymers were determined by a roller frame method. This consisted of testing 1 gram tresses of hair curled in an undulating wave pattern on 1.8cm diameter rollers. Each end of the tress was glued to a small card weighing 0.5 gram, the cards being 14.5cms apart. The tresses were thoroughly wetted under running water, lightly combed and set in the roller frame and allowed to come to equilibrium at 30 percent relative humidity (R.H.) overnight.

The copolymers to be tested were dissolved in methylene chloride to form 3 percent solutions. After the overnight equilibration, the tress on the roller frame was dipped into one of the 3 percent solutions, excess solution was shaken off, and the tress was allowed to dry for one hour at 30 percent R.H. and 25°C.; the amount of polymer deposited on the hair (the "add-on") was about 80mg/gram of hair. The tress was then removed from the roller frame and the distance between the two cards was measured while the tress hung vertically; at this stage, a similar tress was also examined for feel. The tress was then placed in a cabinet at 90 percent R.H. and 24°C. for 2 hours, after which time the tress was removed, hung vertically, and the distance between the cards was re-measured.

The hanging length for 100 percent relaxation of the set was 14.5cms; the hanging length for zero relaxation was 11.0cms (this figure being a function of the size of the roller frame):

$$\% \text{ relaxation} = \frac{\text{final length} - 11.0}{14.5 - 11.0} \times 100.$$

percent retention = 100 - percent relaxation.

(It will be appreciated from this description, that the higher the "percent retention" figure, the better the resistance to humidity of the polymer tested.)

In addition to testing the six block polymers in this way, 3 percent solutions in methylene chloride of the random copolymers X and Y which are currently used in commercially available setting lotions and hair sprays, were also tested in the same way. Details of the block copolymers, and the test results obtained, are shown in Table I.

Table I

| Ex./Polymer | A segments | B segment | % retention |
|---|---|---|---|
| 1. | 80.6% | 19.4% | 88 |
| 2. | 70.5% | 29.5% | 89 |

Table I-Continued

| Ex./Polymer | A segments | B segment | % retention |
|---|---|---|---|
| 3. | 60% | 40% | 91 |
| 4. | 50% | 50% | 94 |
| 5. | 40% | 60% | 94 |
| 6. | 25% | 75% | 80 |
| X | — | — | 60 |
| Y | — | — | 63–74 |

The tresses set with solutions of copolymers 1 to 6 all had good feel. As can be seen from the table, all of the copolymers 1 to 6 had substantially better resistance to humidity than did X and Y. All of copolymers 1 to 6 had a molecular weight of about 100,000.

EXAMPLES 7 AND 8

Two block copolymers of the A-B-A type in which the A segments were poly (2-vinylpyridine) and the B segment was polybutadiene, were prepared as described for Examples 1 to 6.

The relative proportions of the A and B segments in the copolymers were determined as described for Examples 1 to 6 and were found to be the same as the relative proportions of the monomers used.

These two copolymers were tested as hair spray polymers. For this purpose they were used in the form of 2 percent solutions in ethanol. The set retention test used was as described for Examples 1 to 6, the tress, after the overnight equilibration on the roller frame, being sprayed with the polymer solution by means of a De Vilbis type EGA-502 air gun held at a distance of 20cms from the tress. Spraying was carried out so that the amount of polymer deposited on the hair (the "add-on") was 6 to 10mg/gram of hair. Drying of the tress, the exposure to conditions of high humidity, and the two measurements of tress length were carried out as described for Examples 1 to 6.

In addition to testing the two block copolymers, two commercially available hair sprays X and Y were also tested in the same way.

Details of the block copolymers the results of testing are shown in Table II.

Table II

| Ex./Polymer | A segments | B segment | % retention |
|---|---|---|---|
| 7. | 80.0% | 20% | 71 |
| 8. | 90.0% | 10% | 79 |
| X | — | — | 25 |
| Y | — | — | 50 |

Block copolymers 7 and 8 gave an excellent feel. It will be seen from the table that these two polymers had better humidity resistance than the polymers of the commercially available hair sprays.

EXAMPLE 9

A block copolymer of the A-B-A type comprising 50 percent A segments of poly (4-vinylpyridine) and 50 percent B segment of poly (2-ethylhexyl methacrylate) was prepared as described for Examples 1 to 6, but using 100 grams of 2-ethylhexyl methacrylate in place of the 1,3-butadiene and 100 grams of 4-vinylpyridine in place of the 2-vinylpyridine.

The relative proportions of A and B segments were determined as described for Examples 1 to 6.

The set retention of this copolymer when used as a setting lotion and tested as described in Examples 1 to 6, was 83 percent.

EXAMPLE 10

A block copolymer of the A-B-A type comprising 50 percent A segments of poly (4-vinylpyridine) and 50 percent B segment of poly (n-butyl methacrylate) was prepared as described for Examples 1 to 6, but using 100 grams of n-butyl methacrylate in place of the 1,3-butadiene and 100 grams of 4-vinylpyridine in place of the 2-vinylpyridine.

The relative proportions of A and B segments were determined as described in Examples 1 to 6.

The set retention of this copolymer when used as a setting lotion and tested as described in Examples 1 to 6, was 81 percent.

Having thus described our invention, we claim:

1. A hair holding composition, which comprises a solution, in an organic solvent selected from the class consisting of ethanol, isopropanol, and methylene dichloride, of an effective amount of a water-insoluble block copolymer represented by the formula, A—B—(A-B)$_n$-A; in which segments A are selected from the class consisting of polymers of 2-vinylpyridine, 4-vinylpyridine, 2-methyl-5-vinylpyridine, and acrylamides and methacrylamides of the formula $CH_2$=CXCONR'R", where X is H or $CH_3$, R' is H or an n-alkyl group containing from 3 to about 8 carbon atoms, and R" is an n-alkyl group containing from 3 to about 8 carbon atoms; segments B are selected from the class consisting of polymers of butadiene, isoprene, isobutene, an alkyl acrylate where the alkyl group contains from 2 to 12 carbon atoms, an alkyl methacrylate where the alkyl contains 4 to 12 carbon atoms, a vinyl n-alkyl ether where the alkyl group contains 1 to 4 carbon atoms, an alkyl-substituted butadiene where the alkyl group contains 1 to 4 carbon atoms, and chloroprene; $n$ is 0 or an integer from 1 to 5; and the block copolymer contains from about 10 to about 90 percent by weight of segments A and, complementally, from about 90 to about 10 percent of segments B.

2. The hair holding composition as defined in claim 1 in which segments A are poly (2-vinylpyridine) and segments B are polybutadiene.

3. The hair holding composition as defined in claim 2 in which the block copolymer has a molecular weight from about 10,000 to about 100,000.

4. The hair holding composition as defined in claim 2 in which the organic solvent is ethanol, and the block copolymer contains from about 70 to about 90 percent by weight of segments A and, complementally, from about 30 to about 10 percent by weight of segments B.

5. The hair holding composition as described in claim 2, in which the organic solvent is methylene dichloride, and the block copolymer contains from about 10 to about 90 percent by weight of segments A and, complementally, from about 90 to about 10 percent of segments B.

6. The hair holding composition as defined in claim 1, which also includes a perfume.

7. The hair holding composition as defined in claim 1, which also includes a propellant.

* * * * *